Oct. 25, 1955    L. BERTELE    2,721,501
THREE-COMPONENT OBJECTIVE
Filed March 8, 1954
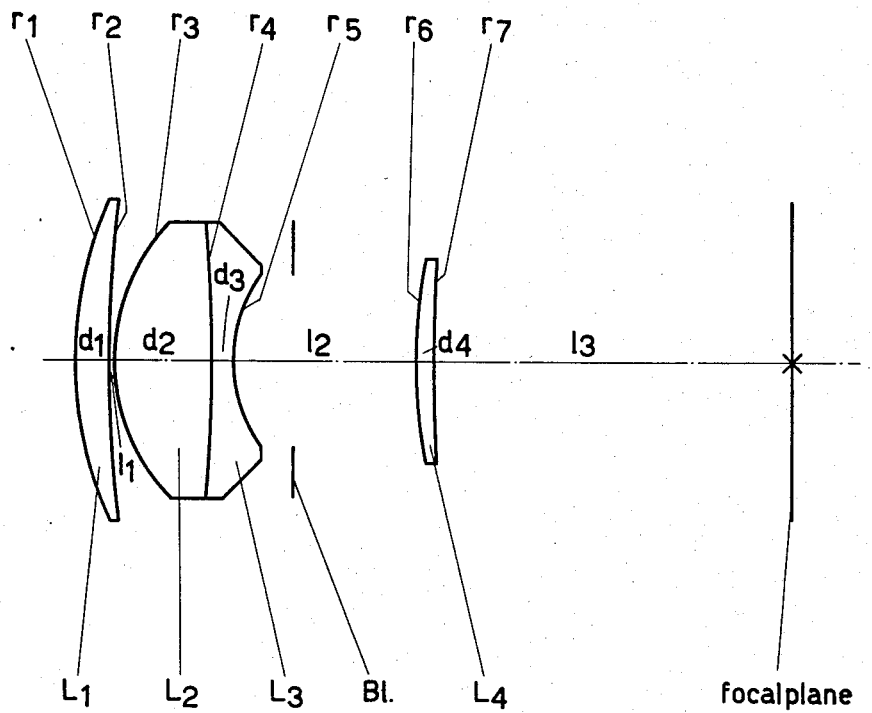

United States Patent Office 2,721,501
Patented Oct. 25, 1955

2,721,501

THREE-COMPONENT OBJECTIVE

Ludwig Bertele, Heerbrugg, Sankt Gallen, Switzerland

Application March 8, 1954, Serial No. 414,825

1 Claim. (Cl. 88—57)

The present invention relates to an improvement of a known type of objectives having a ratio of aperture of about 1:2.8, which type essentially consists of three members separated by air spaces. The first member, i. e. the member facing the object, as well as the third member are each a single collective lens and the middle member is a meniscus bent towards the object and being composed only of two single lenses. The air space between the first and the middle member is of the shape of a thin negative lens, the stronger curved surface of it being directed towards the image, and the air space between the middle and the third member having the shape of a thick lens with its stronger curved surface directed towards the object.

Investigations have shown, that, in opposition to the examples in the U. S. Patent 2,622,479, it is also possible to increase the available image angle, if the middle member is composed of only two cemented lenses, the one towards the object being biconvex and the one towards the image being biconcave with a higher refractive index than said biconvex lens and a focal length smaller than $-0.30\ f$, and if the axial thickness of the two lenses composing the middle member is chosen smaller than $0.20\ f$ and greater than $0.13\ f$ and if the sum of the reciprocal values of the radii of curvature of the lens surfaces directed towards the object of said first and said second member diminished with reciprocal value of the radius of curvature of the lens surface directed towards the image of said first member is greater than $$\frac{4.0}{f}$$

and smaller than $$\frac{6.3}{f}$$

f being the focal length of the objective. Without considerable increase in the zonal defects of the spherical aberration it is herewith possible to make the errors of coma invisible with image angles up to about $\pm 15°$ with an aperture of the pencils, which allows one to keep the decrease of light towards the coma of the image within tolerable limits.

In the figure of the drawing an example of the invention is shown having a ratio of aperture of 1:2.8. The data of this example are given by the following, calculated according to a focal length of the objective of 100 units.

The focal length of the third lens is $-0.258\ f$, the axial thickness of the middle member is $0.1655\ f$ and the sum $$\frac{1}{r_1}+\frac{1}{r_3}-\frac{1}{r_2}=\frac{5.14}{f}$$

In the example $r$ are the radii of the refracting surfaces, $d$ are the thicknesses of the lenses L and $l$ are the air spaces between the lenses L. $B_1$ means the diaphragm.

Example

|  |  |  | $n_d$ | V |
|---|---|---|---|---|
| $L_1$ | $r_1=+\ 52.43$ | $d_1=\ 4.60$ | 1.66994 | 47.2 |
|  | $r_2=-181.91$ | $l_1=\ 0.46$ |  |  |
|  | $r_3=+\ 26.44$ |  |  |  |
| $L_2$ |  | $d_2=13.45$ | 1.56536 | 55.8 |
|  | $r_4=-218.39$ |  |  |  |
| $L_3$ |  | $d_3=\ 3.10$ | 1.68981 | 31.2 |
|  | $r_5=+\ 19.52$ |  |  |  |
|  |  | $l_2=24.71$ |  |  |
|  | $r_6=+\ 69.31$ |  |  |  |
| $L_4$ |  | $d_4=\ 2.53$ | 1.72747 | 28.4 |
|  | $r_7=+224.83$ |  |  |  |

I claim:

An objective composed of three members separated by air spaces, of which the first and third members are single lenses and the middle member is a meniscus bent towards the object, which meniscus is composed of only two lenses in such a manner that a biconvex lens is cemented with a biconcave lens with a focal length smaller than $-0.30\ f$ and a higher refractive index than that of said biconvex lens, the air space between said first member and said middle member having the shape of a divergent lens bent towards the object and the air space between said middle member and said third member having the shape of a thick collecting meniscus, the single collective lens constituting said third member consisting of a glass of strong color dispersion, the axial thickness of said middle member being smaller than $0.20\ f$ and greater than $0.13\ f$, the sum of the reciprocal values of the radii of curvature of the lens surfaces directed towards the object of said first and said second members diminished with the reciprocal value of the radius of curvature of the lens surface directed towards the image of said first member being greater than $$\frac{4.0}{f}$$

and smaller than $$\frac{6.3}{f}$$

f being the focal length of the objective.

References Cited in the file of this patent

UNITED STATES PATENTS

| 568,052 | Taylor | Sept. 22, 1896 |
| 2,622,479 | Bertele | Dec. 23, 1952 |

FOREIGN PATENTS

| 212,999 | Great Britain | Mar. 21, 1924 |
| 350,323 | Great Britain | June 11, 1931 |
| 826,321 | France | Jan. 4, 1938 |